3,143,533
MALEIC ANHYDRIDE COPOLYMER

Huey Pledger, Jr., Lake Jackson, Tex., assignor to The Dow Chemical Company, Midland, Mich., a corporation of Delaware
No Drawing. Filed May 22, 1961, Ser. No. 111,471
4 Claims. (Cl. 260—78.5)

This invention relates to a novel copolymer of maleic-anhydride and to a process whereby it may be prepared. It relates more particularly to a normally solid thermoplastic product obtained by copolymerizing maleic anhydride with 5-methylenebicyclo[2.2.1]hept-2-ene.

The latter compound may be prepared by reacting allene with cyclopentadiene at about 200° C. in about equimolar proportions and under the autogenous pressure of the system as set forth in my copending application, Serial No. 63,975, filed October 2, 1960, or by a method disclosed by Schleyer et al. in Paper No. 0-66 presented to the American Chemical Society meeting in Chicago, September 1958.

Although maleic anhydride and 5-methylenebicyclo-[2.2.1]hept-2-ene, hereinafter referred to as MA and MBH respectively, as individual compounds homopolymerize only with great difficult, it has been found that MA and MBH will copolymerize readily under suitable conditions.

The copolymer produced is a white thermoplastic solid having a melting point of about 200° C. or higher depending upon the extent to which the polymerizing process is carried out. On the same basis, the copolymer is more or less soluble in various organic solvents. Tetrahydrofuran, methyl ethyl ketone, and pyridine are some representative solvents ni which the copolymer is more or less soluble. The solid copolymer can be molded into useful shapes, either as such, in which case the moldings are hard and somewhat brittle, or it may be compounded with any of various known plasticizers, fillers, or other thermoplastic materials to obtain products with modified properties. Its solutions in organic solvents are useful in the preparation of protective coatings.

The copolymer contains equal molar proportions of maleic anhydride and MBH as determined by titration, infrared examination, and other analytical studies, and it is thought that the copolymer molecular structure is made up essentially of linear chains of alternating MA and MBH units. This essentially equal molar ratio of the two monomers in the copolymer is characteristic and it remains substantially unchanged regardless of the proportion of the two monomers present in the copolymerizing reaction mixture, the type or amount of solvent used, the temperature, the rate of copolymerization, or the particular initiating catalyst or its concentration. However, these factors do affect the yield of copolymer, its molecular weight, and the degree to which the copolymer is crosslinked. Evidently, the two double bonds in MBH allow it to act as a crosslinking agent under certain conditions. Conditions most favorable to crosslinking are a relatively high ratio of maleic anhydride to MBH in the copolymerization mixture and higher concentrations of the monomers in the mixture. A significant amount of crosslinking is disadvantageous, for as crosslinking occurs in the copolymer structure, the product shows a very rapid increase in molecular weight and melting point and a correspondingly rapid decrease in solubility to the point where the copolymer is soon both infusible and insoluble. At intermediate points in a copolymerization, the product may consist of a mixture of soluble, fusible copolymer with insoluble, infusible, more crosslinked copolymer.

Preferably, the copolymerization of MA and MBH is carried out in relatively dilute solution in an inert organic solvent, that is, a solvent which is unreactive under the reaction conditions. Suitable solvents include hydrocarbons such as benzene, toluene, xylene, and decane, oxygenated solvents such as acetone and methyl ethyl ketone, halogenated solvents, and others not having active hydrogen atoms in their structures. The copolymerization is conveniently carried out to produce a copolymer in good yield and having desirable properties when at least about 500 cc. of solvent is used per gram mole of total monomers present.

A suitable temperature range for the copolymerization is about 50–100° C. although temperatures outside this range may be used advantageously under some conditions.

The molar ratio of the two monomers has an effect both on the rate of copolymerization and on the nature of the product formed. The rate of copolymerization is increased by raising the relative proportion of MBH in the mixture and this larger proportion of MBH also decreases the amount of crosslinking, thereby producing a copolymer of more desirable properties. Preferably, at least one mole of MBH per mole of maleic anhydride is used. Good results are obtained from a copolymerization reaction mixture containing five moles of MBH per mole of MA.

The initiation and the progress of the copolymerization are accelerated by the presence in the mixture of the two monomers of a small amount of any of known free radical initiators. Effective initiators include peroxides, for example, benzoyl peroxide or tert.-buty hydroperoxide, azo catalysts such as azobisisobutyronitrile, and radiation, for example, actinic radiation such as ultraviolet light and X-rays or radiation from a radioactive source. The rate of copolymerization is increased by using larger amounts of such catalysts, at least to a certain point. When using benzoyl peroxide, for example, as an initiator for this copolymerization, progressively less effect on the rate was found when more than about 0.5 mole percent of peroxide per mole of limiting monomer was used.

Copolymerization of a mixture of MA and MBH will occur in the absence of these catalysts, although it is thought probable that in this case, peroxides formed by exposure of the monomers to air are acting as polymerization initiators.

Too long a reaction time is to be avoided when copolymerizing MA and MBH since this increases the possibility of crosslinking. Therefore, the conditions under which the copolymerization is carried out are preferably adjusted to give a relatively rapid rate.

Example 1 illustrates the preparation of the MA-MBH copolymer within the preferred ranges of conditions.

EXAMPLE 1

A flask equipped with a reflux condenser, a stirrer, a thermometer, and a gas inlet tube was charged with 0.2 g. mole of maleic anhydride and 3000 cc. of xylene. This solution was heated to 50° C. on a water bath and stirred until the maleic anhydride had dissolved. To this solution was added 1.0 g. mole of 5-methylenebicyclo[2.2.1]-hept-2-ene and a stream of dry nitrogen was started through the gas inlet tube, thereby maintaining a nitrogen blanket over the solution during the polymerization. Benzoyl peroxide was added to the solution in an amount of 0.002 g. mole (0.5 g.) and the stirred solution was heated above 50° C. After a few minutes when the temperature had reached about 70° C., the solution became cloudy, indicating the formation of copolymer. Heating was continued until the temperature of the reaction mixture reached 90° C. where it was maintained during the rest of the reaction period. After about 3 hours at 90° C., the reaction was stopped by addition to the mixture of about 5 cc. of a 10 percent solution of N-phenyl-2-naphthylamine. The reaction mixture was cooled to about room temperature, stirring was stopped, and the precipitated copolymer was separated by suction filtration. The filter cake was washed with methanol and dried under vacuum at 70–95° C. to constant weight. The dried product was a white powder amounting to 25.4 g. It was soluble in tetrahydrofuran and methyl ethyl ketone and had a beginning melting point of 228° C. When compression molded, it formed a hard, clear solid. Titration of unreacted maleic anhydride in the combined filtrates showed that 70.3 percent of the maleic anhydride had been reacted. A sample of the copolymer was hydrolyzed to the polyacid form by boiling in aqueous pyridine and the polyacid obtained was potentiometrically titrated in aqueous acetone with standard NaOH solution. The copolymer was thus found to contain 1.017 moles of maleic anhydride per mole of MBH.

Table I illustrates the effects of dilution, ratio of the two monomers, and polymerization time, respectively, on the amount and type of copolymer produced. As shown in the table, increased dilution, increased MA/MBH ratio, and increased polymerization time all resulted in less copolymerization and less crosslinking in the copolymer product. Reduced crosslinking is indicated by a higher proportion of soluble copolymer in the product obtained. The proportion of soluble copolymer was determined by extracting the product with tetrahydrofuran.

*Table I*

| Gram, Moles | | Solvent, cc. Xylene | Time Hrs. | Percent Reacted | Percent Soluble Polymer |
| --- | --- | --- | --- | --- | --- |
| MA | MBH | | | | |
| 2.0 | 1.0 | 1,000 | 3 | 39.1 | 25.8 |
| 2.0 | 1.0 | 2,000 | 3 | 29.2 | 100 |
| 0.2 | 1.0 | 1,000 | 0.5 | 42.8 | 50.0 |
| 2.0 | 1.0 | 1,000 | 0.5 | 16.3 | 70.8 |
| 1.0 | 1.0 | 1,000 | 3 | 38.3 | 18.9 |
| 1.0 | 1.0 | 1,000 | 1 | 18.5 | 52.8 |

The above copolymerizations were run in the same manner as described in Example 1 except for the changes in concentration, monomer ratio, and polymerization time as shown in the table.

I claim:

1. A thermoplastic copolymer of maleic anhydride and 5-methylenebicyclo[2.2.1]hept-2-ene.

2. The thermoplastic copolymer of claim 1 wherein the molar ratio of maleic anhydride to 5-methylenebicyclo[2.2.1]-hept-2-ene is essentially one to one.

3. A process for making a thermoplastic copolymer of maleic anhydride and 5-methylenebicyclo[2.2.1]hept-2-ene which comprises contacting maleic anhydride and 5-methylenebicyclo[2.2.2-]hept-2-ene in the presence of an effective amount of a free radical initiating catalyst.

4. The process of claim 3 wherein the copolymerization is carried out in solution in an inert organic solvent at about 50–100° C.

References Cited in the file of this patent

UNITED STATES PATENTS 2,799,668    Anderson et al. _____ July 16, 1957
2,886,608    Drysdale _____ May 12, 1959

OTHER REFERENCES

Ullman: "Chemistry and Industry," London, September 1958 (pages 1173–1174), TPI S63.